(12) United States Patent
Owens

(10) Patent No.: US 8,579,082 B1
(45) Date of Patent: Nov. 12, 2013

(54) PORTABLE HUNTING STAND APPARATUS AND METHODS

(76) Inventor: Robert T. Owens, Moundville, AL (US)

(*) Notice: Subject to any disclaimer, the term of this patent is extended or adjusted under 35 U.S.C. 154(b) by 114 days.

(21) Appl. No.: 13/269,982

(22) Filed: Oct. 10, 2011

(51) Int. Cl.
A01M 31/02 (2006.01)
E06C 5/00 (2006.01)
E06C 7/16 (2006.01)

(52) U.S. Cl.
USPC .................. 182/116; 182/127; 182/180.2

(58) Field of Classification Search
USPC ............... 182/116, 127, 180.2, 180.3
See application file for complete search history.

(56) References Cited

U.S. PATENT DOCUMENTS

| 310,434 | A | 1/1885 | Huber | |
|---|---|---|---|---|
| 1,148,035 | A | 7/1915 | Miller | |
| 1,845,537 | A | 2/1932 | Wilder | |
| 2,046,516 | A | 7/1936 | Johnson | |
| 5,433,291 | A | 7/1995 | Shoestock, Sr. | |
| 5,566,780 | A | 10/1996 | Bambrough | |
| 5,624,008 | A | 4/1997 | Beardslee, Jr. | |
| 5,839,538 | A | 11/1998 | Magyar | |
| 6,053,284 | A | * | 4/2000 | Fountain .................. 182/180.2 |
| 6,550,575 | B2 | | 4/2003 | Spencer et al. |
| 6,811,180 | B1 | * | 11/2004 | Molliere ...................... 280/652 |
| 7,168,521 | B1 | | 1/2007 | Murray |
| 7,389,854 | B1 | * | 6/2008 | Johnson et al. ............... 182/127 |
| 7,614,480 | B2 | | 11/2009 | Smiley |
| 2002/0179369 | A1 | * | 12/2002 | Wallace ...................... 182/63.1 |
| 2009/0229914 | A1 | | 9/2009 | Liles |

* cited by examiner

Primary Examiner — Alvin Chin Shue
(74) Attorney, Agent, or Firm — Kenneth M. Bush; Bush Intellectual Property Law

(57) ABSTRACT

A ladder stand support apparatus is disclosed herein. In various aspects, the ladder stand support apparatus may include a base adapted to transport ladder stand sections of a ladder stand, and the base is adapted for attachment to a tree. In various aspects, the ladder stand apparatus may include a channel member rotatably connected to the base, the channel member adapted to receive a rail of a ladder stand within a channel defined therein.

3 Claims, 4 Drawing Sheets

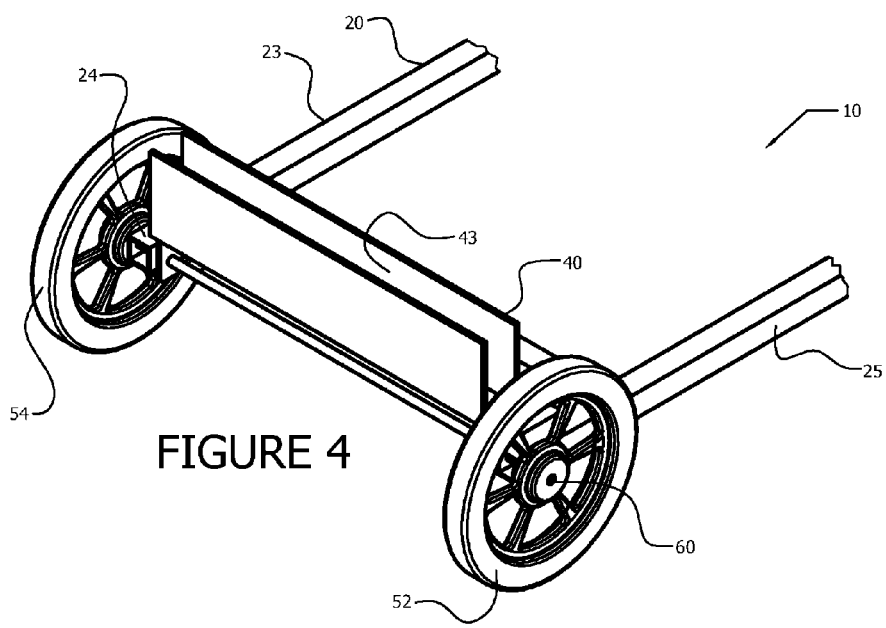
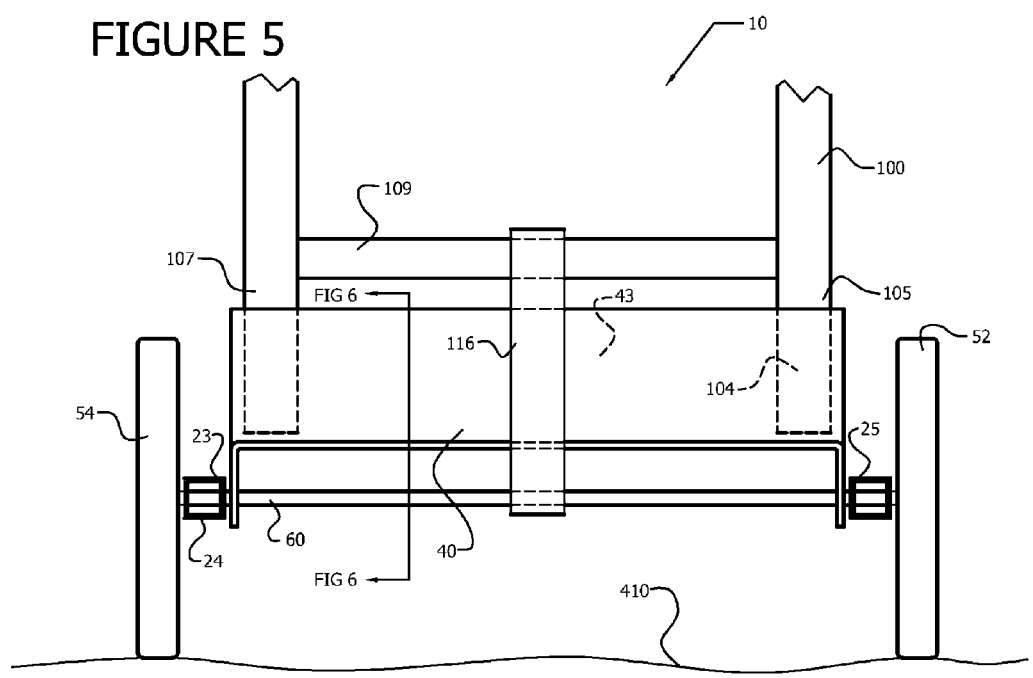

US 8,579,082 B1

PORTABLE HUNTING STAND APPARATUS AND METHODS

FIELD OF THE INVENTION

This disclosure relates to ladders and, more particularly, apparatus and methods for the deployment of ladder stands.

BACKGROUND OF THE INVENTION

A ladder stand, in various aspects, provides an elevated seat or platform for a hunter, wildlife photographer, and so forth. The ladder stand may be formed of metal and may be heavy and awkward to transport, particularly to remote locations. Furthermore, the ladder stand may be difficult for a single user to place into position against a tree or to remove from position against a tree.

Accordingly, there is a need for improved apparatus as well as related methods that assist in the deployment of ladder stands.

BRIEF SUMMARY OF THE INVENTION

These and other needs and disadvantages may be overcome by the apparatus and related methods disclosed herein. Additional improvements and advantages may be recognized by those of ordinary skill in the art upon study of the present disclosure.

A ladder stand support apparatus is disclosed herein. In various aspects, the ladder stand support apparatus may include a base adapted to transport ladder stand sections of a ladder stand, and the base is adapted for attachment to a tree. In various aspects, the ladder stand apparatus may include a channel member rotatably connected to the base, the channel member adapted to receive a rail of a ladder stand within a channel defined therein.

Corresponding methods of deploying a ladder stand are disclosed herein. In various aspects, the methods may include the steps of positioning a support member connected to a base from a collapsed position to an extended position, attaching the support member in the extended position to a tree, securing rails of the ladder stand within a channel of a channel member following the step of attaching the support member in the extended position to a tree, the channel member rotatably connected to the base, and positioning the ladder stand from an undeployed position to a deployed position by rotating the channel member with rails of the ladder stand secured within the channel thereof.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

BRIEF DESCRIPTION OF THE DRAWINGS

FIG. 4 illustrates by perspective view portions of the exemplary implementation of the ladder stand support apparatus of FIG. 1;

FIG. 5 illustrates by frontal elevation view portions of the exemplary implementation of the ladder stand support apparatus of FIG. 1;

Figure 1:
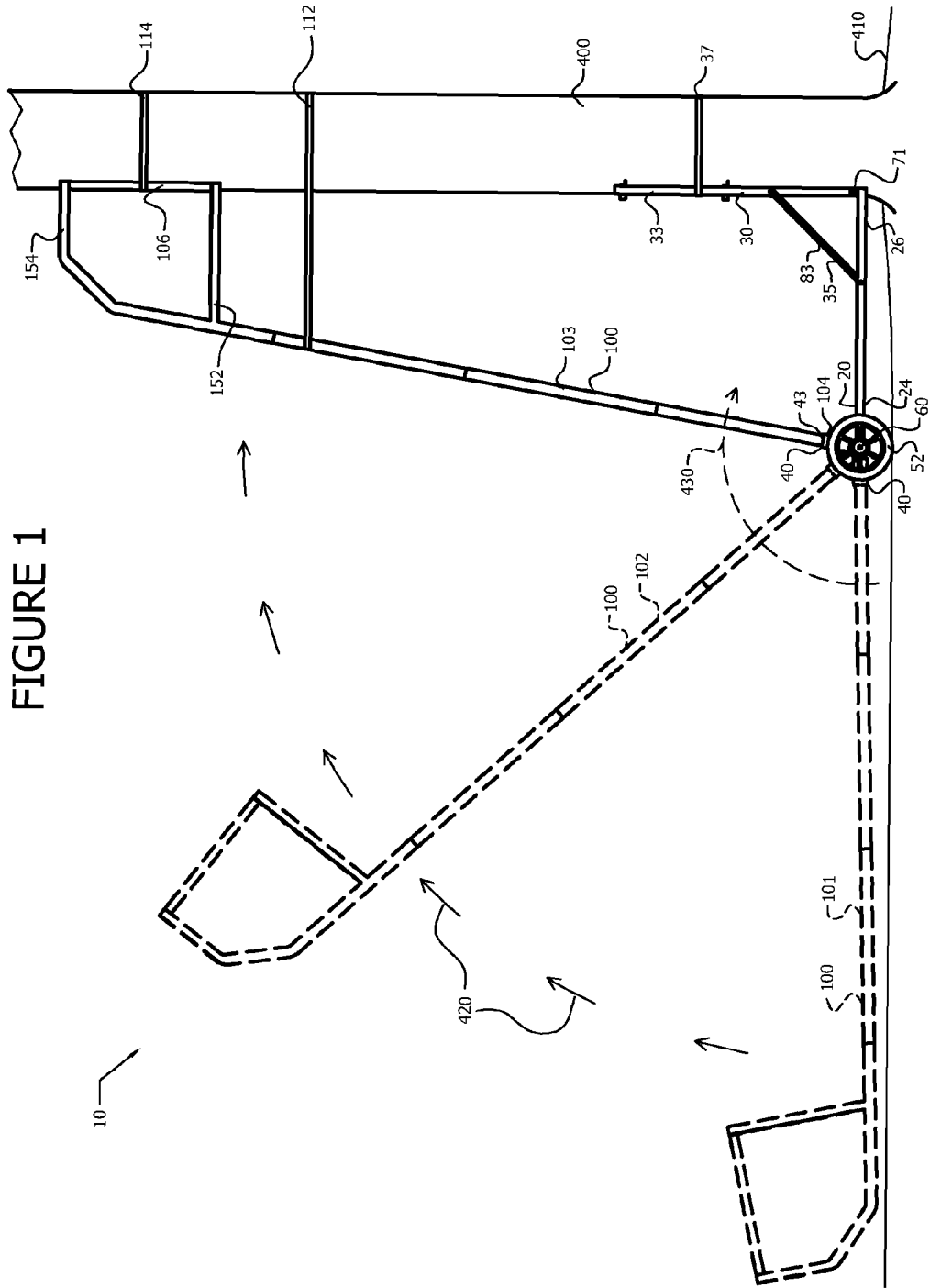
FIG. 1 illustrates by side elevation view an exemplary implementation of ladder stand support apparatus with a ladder stand at various stages of deployment between an undeployed position and a deployed position.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

A ladder stand support apparatus and related methods are disclosed herein. In various aspects, the ladder stand support apparatus may allow a ladder stand to be transported to a site and, after assembly of the ladder stand, to be placed at an elevated location in a tree by a single user. The ladder stand support apparatus, in various aspects, may include a base adapted to transport ladder stand sections that make up the ladder stand, and one or more wheels may be attached to the base. The base may be attached to the tree, and a support member may be provided to attach the base to the tree.

In various aspects, the support member may be positionable between a collapsed position and an extended position. In the collapsed position, the support member may be generally biased about the base for transport thereupon. The support member in the extended position may be generally vertically oriented for attachment to a tree to secure the base to the tree.

The ladder stand support apparatus may include a channel member rotatably connected to the base, and the channel member may be formed to include a channel. With the ladder stand in an undeployed position, a rail end of a rail that forms a side portion of the ladder stand may be received within the channel and secured therein. With rails of the ladder stand secured within the channel of the channel member and the base secured to the tree by the support member, rotating the channel member with the ladder stand secured therein rotates the ladder stand from the undeployed position to a deployed position. With the ladder stand in the deployed position, the ladder stand may be rotated from the deployed position to the undeployed position by rotating the channel member with the ladder stand engaged therein.

FIG. 1 illustrates ladder stand support apparatus 10. As illustrated in FIG. 1, ladder stand support apparatus 10 includes base 20, support member 30, and channel member 40. Ladder stand support apparatus 10, in this implementation, includes wheel 52 and wheel 54 (see FIGS. 2, 4, 5) that rotate about axle 60 with axle 60 attached to base 20 generally proximate end 24. Base 20 rests upon wheels 52, 54 that, in turn, rest upon the ground 410 so that base 20 may be transported by being rolled about on wheels 52, 54. Ladder stand support apparatus 10 may include ladder stand 100, in various implementations.

As illustrated in FIG. 1, support member 30 is engaged with base 20 generally proximate end 26 of base 20, and end 26 of base 20 is secured to tree 400 by support member 30. Tree 400, as used herein, includes trees, poles, and other natural and man-made elevated structures. The support member 30 may be omitted such that end 26 of base 20 is secured to tree 400 in other ways, in various other implementations. For example, end 26 of base 20 may be secured to tree 400 using straps (e.g. strap 37), various fasteners, or other attachment devices.

In the implementation illustrated in FIG. 1, support member 30 is positioned in the extended position 33. Support member 30 in extended position 33 is placed against tree 400, and support member 30 is secured to tree 400 by strap 37 to secure base 20 to tree 400. Support member 30 may be rotated about fastener 71 to position support member 30 from collapsed position (see FIG. 2) into extended position 33. Brace 35 in the brace extended position 83 is connected to support member 30 and brace 35 is connected to base 20 to hold support member 30 in extended position 33, in this implementation.

One or more clasps (not shown) may be included to secure adjustably strap 37 about support member 30 and tree 400 to secure support member 30 to tree 400. Support member 30 may be secured to tree 400 using various cables, ropes, and so forth, in various other implementations. Support member 30 may be secured to tree 400 using various fasteners such as lag bolts, nails, screws, and so forth, in various other implementations.

Channel member 40 is rotatably attached to axle 60, and axle 60 is attached to base 20 so that channel member 40 is rotatably attached to base 20, in this implementation. Channel member 40 defines channel 43, and channel 43 of channel member 40 is sized such that ladder stand end 104 of ladder stand 100 may be inserted into channel 43 and secured within channel 43 so that ladder stand end 104 of ladder stand 100 is secured to channel member 40. In other implementations, channel member 40 may be rotatably attached to base 20 generally proximate end 24 of base 20 in other ways. For example, wheels 52, 54 may be engaged to base on separate axles (not shown), or channel member 40 may be rotatably attached to base 20 by axle(s) (not shown), separate from the axle(s) by which wheels 52, 54 are attached to base 20.

With the support member 30 secured to tree 400 and ladder stand 100 secured to channel member 40 by engagement of ladder stand end 104 in channel 43, ladder stand 100 may be rotated from undeployed position 101 into the deployed position 103 by rotating ladder stand 100 in combination with channel member 40. As illustrated in FIG. 1, ladder stand 100 is rotated in combination with channel member 40 from undeployed position 101 (illustrated in phantom) through intermediate position 102 (shown in phantom) into deployed position 103, as indicated by arrows 420 in the Figure. As ladder stand 100 is rotated from undeployed position 101 into deployed position 103, channel member 40 holds ladder stand end 104 of ladder stand 100, and channel member 40 rotates with ladder stand 100 as ladder stand 100 is rotated from undeployed position 101 into deployed position 103. The concurrent rotation of channel member 40 with ladder stand 100 is indicated by arrow 430 in FIG. 1. Because ladder stand end 104 is held secure within channel 43 of channel member 40 as ladder stand 100 is rotated from undeployed position 101 into deployed position 103, a single user may be able to rotate ladder stand 100 from undeployed position 101 into deployed position 103, and may do so by lifting/rotating by hand the ladder stand 100.

The ladder stand 100 may be removed from tree 400 in a similar manner. With ladder stand 100 positioned in deployed position 103, ladder stand end 104 of ladder stand 100 may be secured within channel 43 of channel 40, and then ladder stand 100 may be rotated from the deployed position 103 to the undeployed position 101.

As illustrated in FIG. 1, ladder stand 100 is generally resting about the ground 410 when in the undeployed position 101, and ladder stand end 106 of ladder stand 100 is generally placed against tree 400 when ladder stand 100 is placed in deployed position 103. When placed in deployed position 103, ladder stand 100 may be secured to tree 400 in various ways. For example, straps 112, 114 pass about tree 400 and ladder stand 100 to secure ladder stand 100 to tree 400, as illustrated in FIG. 1. One or more clasps (not shown) may be included with each of straps 112, 114 to secure adjustably strap 112, 114 about ladder stand 100 and tree 400 to secure ladder stand 100 to tree 400.

Ladder stand end 104 of ladder stand 100 is secured to tree 400 because, in this implementation, ladder stand end 104 is secured in channel 43 of channel member 40 and channel member 40 is connected to tree 400 by base 20 and support member 30 to hold ladder stand end 104 in position, which prevents ladder stand 100 from falling due to the ladder stand end 104 skidding on ground 410 when ladder stand 100 is positioned into deployed position 103.

Figure 2:
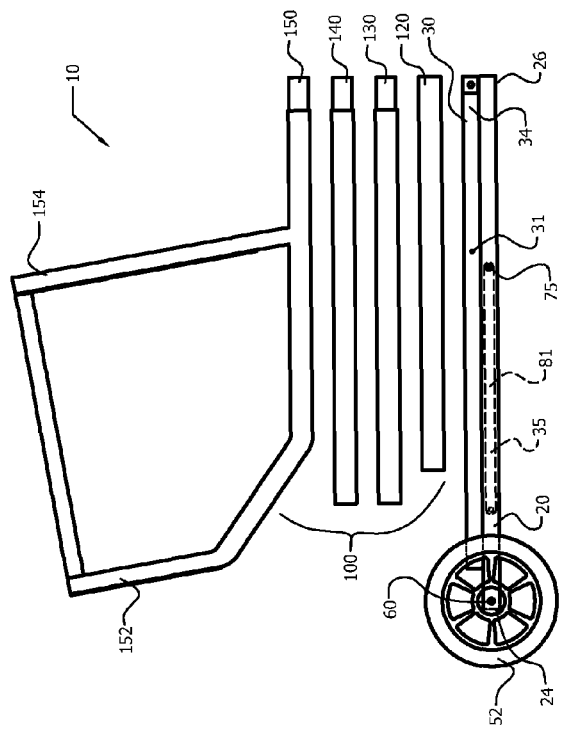
FIG. 2 illustrates by side elevation view the exemplary implementation of the ladder stand support apparatus of FIG. 1 including the ladder stand disassembled for transport.
Figure 8:
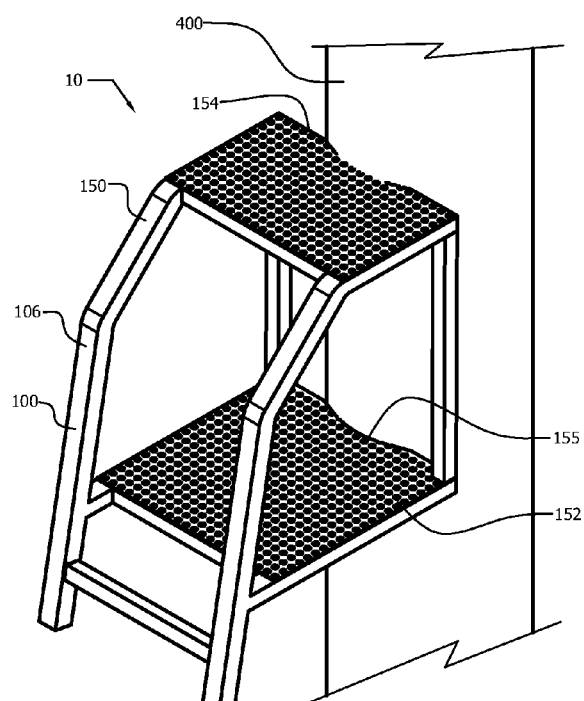

As illustrated in FIG. 1, ladder stand end 106 of ladder stand 100 is formed as a platform section 150 that includes platforms 152, 154 (see FIGS. 2, 8). Accordingly, with ladder stand 100 positioned in the deployed position 103 and secured to tree 400 by straps 112, 114, the user may mount the ladder stand 100 and may sit on platforms 152, 154, may place equipment on platforms 152, 154, and so forth, in this implementation.

Straps 37, 112, 114 and strap 116 (see FIG. 5) may be formed, for example, of polyamide (nylon) or other man-made or natural materials or combinations of materials, in various implementations. Base 20, support member 30, channel member 40, axle 60, and ladder stand 100 may be generally made of steel, aluminum, other materials, or combinations thereof, in various implementations, as would be recognized by those of ordinary skill in the art upon study of this disclosure.

FIG. 2 illustrates transport of ladder stand 100 using base 20. As illustrated in FIG. 2, support member 30 is positioned in collapsed position 31 in which position support member 30 generally rests upon base 20 for transport. Brace 35 (shown in phantom), as illustrated in FIG. 2, is positioned in brace collapsed position 81, in which brace 35 generally rests upon base 20 for transport. Ladder stand 100 is broken down into ladder stand sections 120, 130, 140 and platform section 150, as illustrated, and ladder stand sections 120, 130, 140 and platform section 150 are stacked upon base 20. With support member 30 in the collapsed position 31 and ladder stand sections 120, 130, 140 and platform section 150 of ladder stand 100 stacked upon base 20, base 20 may be transported by being wheeled about on wheels 52, 54. Accordingly, the user may transport ladder stand sections 120, 130, 140 and platform section 150 upon base 20 to and from a site where ladder stand 100 is to be deployed. The user may grasp base 20 generally proximate end 26 to wheel the base 20 about, and one or more handles (not shown) may be provided about end 26 for that purpose. Alternatively, base 20 may be towed, for example, by an all terrain vehicle, and a hitch attachment (not shown) may be provided about base 20 to connect base to a trailer hitch of a vehicle, in some implementations.

Figure 3:
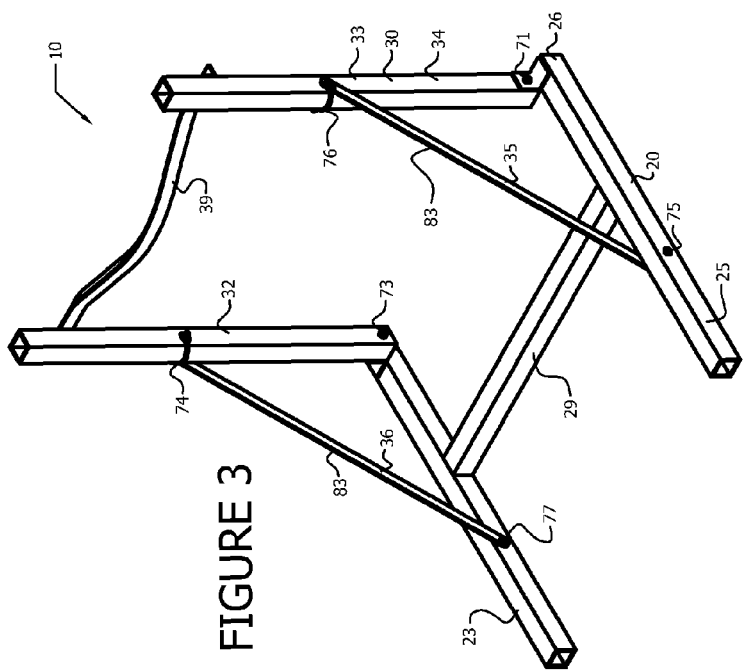
FIG. 3 illustrates by perspective view portions of the exemplary implementation of the ladder stand support apparatus of FIG. 1.

FIG. 3 illustrates portions of base 20 generally proximate end 26, and illustrates support member 30 with support member 30 in extended position 33. As illustrated in FIG. 3, base 20 includes base side 23 and base side 25 connected to one another by one or more base cross-members such as base cross member 29. Support member 30, as illustrated, includes support side 32 and support side 34 connected to one another by one or more cross-members such as cross member 39. Cross member 39 may be curved to accommodate attachment of support member 30 to tree 400. In this implementation, base sides 23, 25, base cross-member 29, side supports 32, 34, and cross-member 39 are formed of hollow structural sections that, for example, may be made of steel or aluminum. Base 20 and side support 30 may be formed in various other ways, in other implementations.

As illustrated in FIG. 3, support member 30 is positioned in extended position 33, and support member 30 may pivot about fasteners 71, 73 between the collapsed position 31 (see FIG. 2) and extended position 33, with support side 32 pivoting about fastener 73 and support side 34 pivoting about fastener 71. Fasteners 71, 73 may be pins, rivets, bolts, or so forth, in various implementations.

Braces 35, 36 may pivot about fasteners 75, 77, respectively, between brace collapsed position 81 (see FIG. 2) and brace extended position 83, as illustrated in FIG. 3. Fasteners 75, 77 may be pins, rivets, bolts, or so forth, in various implementations, and may be generally in fixed attachment. Braces 35, 36 are secured to support sides 34, 32 of support member 30, by clips 76, 74, respectively, as illustrated, through holes provides through braces 35, 36 and support sides 34, 32 for that purpose. Clips 74, 76 may be pins, bolts, screws, and so forth that may be removed. Cotter keys and so forth may be provided to hold clips 74, 76 removably in position to secure braces 36, 35 to support sides 32, 34. Clips 74, 76 may be removed to free braces 36, 35 from attachment to support sides 32, 34 so that braces 36, 35 may be pivoted from brace extended position 83 to brace collapsed position 81 and support member 30 may be pivoted from extended position 33 to collapsed position 31 for transport. With braces 35, 36 in the brace collapsed position 81 and support member 30 in collapsed position 31, support member 30 may be pivoted about fasteners 71, 73 from collapsed position 31 into extended position 33. Braces 35, 36 may then be pivoted from brace collapsed position 81 into the brace extended position 83 and then secured to support member 30 using clips 74, 76 to hold support member 30 in the extended position 33, as illustrated in FIG. 3.

FIG. 4 illustrates portions of base 20 proximate end 24 including tires 52, 54 and channel member 40. As illustrated in FIG. 4, channel member 40 defines channel 43, and channel 43 is formed to receive ladder stand end 104 of ladder stand 100 such that ladder stand end 104 is held securely within channel 43.

FIG. 5 illustrates channel member 40 with ladder stand end 104 of ladder stand 100 secured therein. As illustrated in FIG. 5, ladder stand 100 is formed of rails 105, 107 with rungs such as rung 109 interposed between rails 105, 107. Portions of rails 105, 107 proximate ladder stand end 104 of ladder stand 100 are received within channel 43 of channel member 40, as illustrated. Strap 116 is passed about rung 109 and about channel member 40, as illustrated, to secure ladder stand end 104 of ladder stand 100 within channel 43 of channel member 40. One or more clasps (not shown) may be included to secure adjustably strap 116 about rung 109 and channel member 40 to secure ladder stand 100 within channel 43 of channel member 40. In other implementations (not shown) various mechanical attachments such as pins, bolts, and clamps may be provided to secure ladder stand 100 within channel 43 of channel member 40.

As illustrated in FIG. 5, channel member 40 is secured to axle 60, and axle 60 passes through base sides 23, 25 of base 20 generally proximate end 24 of base 20 to allow the channel member 40 to rotate with respect to base 20. Channel member 40 may be welded to axle 60, or sleeves (not shown) may be provided about channel member 40 through which axle 60 may pass, or channel member 40 may be rotatably connected to axle 60 in various other ways, so that channel member 40 may rotate with respect to base 20, in various implementations. In various implementations, axle 60 may be fixed such that wheels 54 and channel member 40 rotate about fixed axle 60. In various implementations, axle 60 is rotatably connected to base sides 23, 25 to allow axle 60 to rotate.

Figure 6:
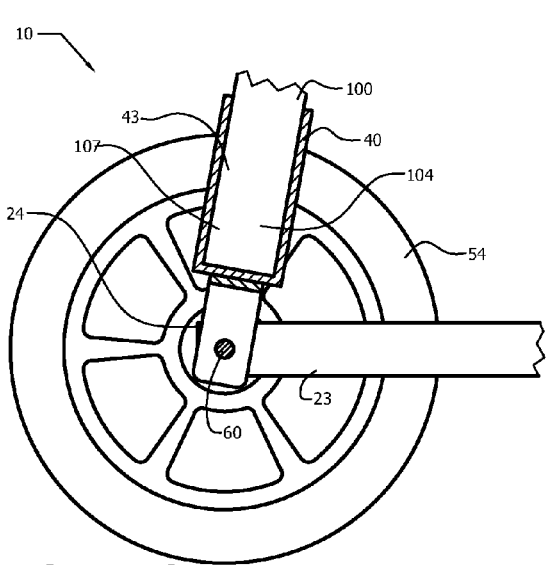
FIG. 6 illustrates by cross-sectional view portions of the exemplary implementation of the ladder stand support apparatus of FIG. 5.

FIG. 6 illustrates rail 107 of ladder stand 100 generally proximate ladder stand end 104 received within channel 43 of channel member 40. Channel member 40, as illustrated, is connected to axle 60, and axle 60 is attached to base 20 so that channel member 40 can rotate with respect to base 20 about axle 60. Wheel 54, in this implementation, rotates about axle 60. Axle 60 passes through base side 23 proximate end 24 of base 20.

Figure 7:
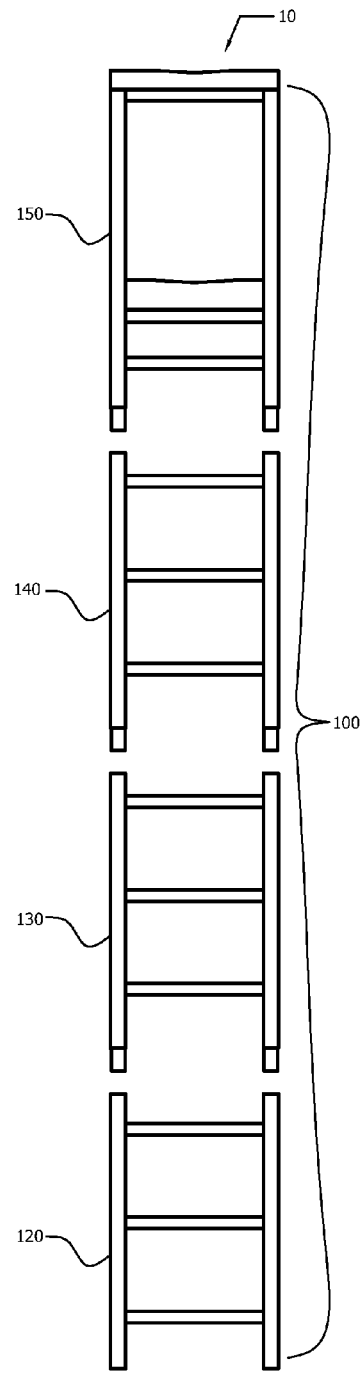
FIG. 7 illustrates by exploded schematic view an exemplary implementation of a ladder stand; and, FIG. 8 illustrates by perspective view portions of an exemplary implementation of a ladder stand.

FIG. 7 illustrates ladder stand 100 including ladder stand sections 120, 130, 140 and platform section 150. Ladder stand sections 120, 130, 140 are attachable to one another in sequence, and platform section 150 may be attached to ladder stand section 140 to form ladder stand 100, as assembled. Ladder stand 100 may be disassembled by detaching ladder stand sections 120, 130, 140 and platform section 150 from one another. When detached from one another, ladder stand sections 120, 130, 140 and platform section 150 may be stacked upon base 20 for transport. Ladder stand 100 may include more or fewer sections, such as sections 120, 130, 140, in various implementations. Ladder stand 100 may or may not include platform section 150, and other structures may be included in ladder stand 100, in various other implementations.

FIG. 8 illustrates portions of ladder stand 100 proximate ladder stand end 106 including platform section 150. As illustrated, platform section 150 includes platforms 152, 154, but may include more or fewer platforms in other implementations. Ladder section 152 is abutted against tree 400, and platform member 155 is curved to bias against tree 400, as illustrated.

In operation, a ladder stand support apparatus, such as ladder stand support apparatus 10, may be transported to a site having a tree, such as tree 400, into which a ladder stand, such as ladder stand 100, is to be placed. The ladder stand support apparatus, in various aspects, may include a base, such as base 20, and one or more wheels, such as wheels 52, 54, may be attached to the base to allow the base to be transported by being rolled about on the wheels. Ladder stand sections, such as ladder stand sections 120, 130, 140, and platform section, such as platform section 150, that make up the ladder stand may be placed upon the base for transport. When the ladder stand support apparatus and ladder stand are located generally at the site, the ladder stand may be assembled from the ladder stand sections and the platform section.

A support member, such as support member 30, may be connected to the base, and the support member may be positioned from a collapsed position, such as collapsed position 31, into an extended position, such as extended position 33.

With the support member in the extended position, the support member may be generally vertically oriented with the tree and then attached to the tree in order to secure the base to the tree. The support member may be attached to the tree using one or more straps such as strap 37. Braces, such as braces 35, 36, may be positioned from a brace collapsed position, such as brace collapsed position 81, into a brace extended position, such as brace extended position 83. The braces in the brace extended position may be secured to the support member in the extended position, to the base, or to both the base and the support member in the extended position to hold the support member in the extended position. Various clips, such as clips 74, 76, may be provided for this purpose. The base may be attached to the tree in other ways, in other implementations.

With the base secured to the tree by the support member, a ladder stand end, such as ladder stand end 104, of the assembled ladder stand may be inserted into a channel, such as channel 43, of a channel member, such as channel member 40, that is rotatably secured about the base, the ladder stand being in an undeployed position, such as undeployed position 101. The ladder stand end is secured in the channel, and various straps such as strap 116, may be provided for that purpose.

With rails of the ladder stand secured within the channel of the channel member and the base secured to the tree by the support member or otherwise secured to the tree, the ladder stand may be rotated in engagement with the rotatable channel member, thereby rotating the ladder stand from the undeployed position to a deployed position, such as deployed position 103. The ladder stand in the deployed position may be secured to the tree, for example, by straps, such as straps 112, 114, that may be provided for that purpose. The user may then mount the ladder stand in the deployed position and then sit, stand, or position equipment on or about the ladder stand including platforms, such as platforms 152, 154.

The ladder stand may be rotated from the deployed position to the undeployed position by rotating the channel member with the ladder stand engaged therein. With the ladder stand now in the undeployed position, the ladder stand may be released from engagement with the channel of the channel member, and may then be disassembled into ladder stand sections and platform section. Following rotation of the ladder stand from the deployed position into the undeployed position, the support member may be released from attachment to the tree and then positioned from the extended position into the collapsed position. In order to position the support member from the extended position into the collapsed position, braces may first be released from engagement between the support member and the base, and the braces may then be positioned from the brace extended position into the brace collapsed position.

With braces in the brace collapsed position and the support member in the collapsed position, the ladder stand sections and platform section may be stacked upon the base, and the base may be wheeled away from the site to transport the ladder stand from the site. The base may be wheeled to or from the site by hand or by towing with a vehicle, in various implementations.

The foregoing discussion along with the Figures discloses and describes various exemplary implementations. These implementations are not meant to limit the scope of coverage, but, instead, to assist in understanding the context of the language used in this specification and in the claims. Upon study of this disclosure and the exemplary implementations herein, one of ordinary skill in the art may readily recognize that various changes, modifications and variations can be made thereto without departing from the spirit and scope of the inventions as defined in the following claims.

The invention claimed is:

1. A method of securing a portable ladder stand to a support structure, comprising the steps of:
   positioning a base member adjacent to the support structure, wherein said base member comprises a first end having an axle with a wheel attached to each axle end, a second end having a support member pivotably attached thereto, and a channel member having an elongated channel therein rotatably attached to said axle;
   pivoting said support member into engagement with the support structure;
   securing said support member to the support structure;
   inserting lower ends of said ladder stand into said elongated channel;
   fastening a strap around a lower rung of said ladder stand and said channel member to secure said lower ends of said ladder stand in said elongated channel;
   pivoting said ladder stand from a substantially horizontal position to a substantially vertical position and into engagement with the support structure, wherein said channel member pivots concurrently with said ladder stand and securely holds said lower ends of said ladder stand as said ladder stand is pivoted into engagement with the support structure, thereby allowing a single user to pivot said ladder stand from said substantially horizontal position into engagement with the support structure; and
   securing said ladder stand to the support structure.

2. The method, as in claim 1, further comprising the step of:
   assembling the ladder stand by connecting ladder stand sections and a platform section to one another.

3. The method, as in claim 1, further comprising the step of:
   attaching the ladder stand to the support structure using a strap.

* * * * *